(12) United States Patent
Wang

(10) Patent No.: US 10,511,396 B2
(45) Date of Patent: Dec. 17, 2019

(54) METHOD AND DEVICE FOR TRIGGERING INTERACTIVE APPLICATION

(71) Applicant: CHINA MOBILE COMMUNICATIONS GROUP CO., LTD., Beijing (CN)

(72) Inventor: Jing Wang, Beijing (CN)

(73) Assignee: CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 15/772,043

(22) PCT Filed: Sep. 2, 2016

(86) PCT No.: PCT/CN2016/097847
§ 371 (c)(1),
(2) Date: Apr. 27, 2018

(87) PCT Pub. No.: WO2017/071402
PCT Pub. Date: May 4, 2017

(65) Prior Publication Data
US 2018/0316449 A1    Nov. 1, 2018

(30) Foreign Application Priority Data

Oct. 30, 2015  (CN) .......................... 2015 1 0728014

(51) Int. Cl.
*H04H 60/33*    (2008.01)
*H04N 21/472*   (2011.01)
*H04N 21/45*    (2011.01)

(52) U.S. Cl.
CPC ...... *H04H 60/33* (2013.01); *H04N 21/47217* (2013.01); *H04N 21/4532* (2013.01)

(58) Field of Classification Search
CPC ........ H04H 60/33; H04H 60/65; H04H 20/38; H04H 20/93; H04N 21/4532;
(Continued)

(56) References Cited

U.S. PATENT DOCUMENTS

2003/0052911 A1* 3/2003 Cohen-solal ...... H04L 29/06027
                                                                 715/738
2005/0251411 A1   11/2005 Ishii
(Continued)

FOREIGN PATENT DOCUMENTS

CN          1395798 A     2/2003
CN          1586078 A     2/2005
(Continued)

OTHER PUBLICATIONS

International Search Report in international application No. PCT/CN2016/097847, dated Nov. 30, 2016.
(Continued)

*Primary Examiner* — Chenea Davis
(74) *Attorney, Agent, or Firm* — Syncoda LLC; Feng Ma

(57) ABSTRACT

A method and a device for triggering an interactive application are applicable in a wearable device. The method includes acquiring interaction information of interactive applications corresponding to a multimedia video, where the interactive applications respectively correspond to different playback moments of the multimedia video; monitoring a user state parameter, where the user state parameter is used for expressing the degree at which a user is interested in the multimedia video being played back at the current moment; determining, on the basis of the user state parameter and a preset criterion received, whether or not to trigger the interactive application corresponding to the current playback moment; and if the determination result is yes, then generating, on the basis of the interaction information of the
(Continued)

interactive application corresponding to the current playback moment, first prompt information used for prompting the user to execute the corresponding interactive application.

16 Claims, 9 Drawing Sheets

(58) Field of Classification Search
CPC ......... H04N 21/47217; H04N 21/4126; H04N 21/42201; H04N 21/44218; H04N 21/47815; H04N 21/4316
See application file for complete search history.

(56) References Cited

U.S. PATENT DOCUMENTS

| | | | |
|---|---|---|---|
| 2008/0222671 | A1 | 9/2008 | Lee |
| 2014/0125703 | A1* | 5/2014 | Roveta ................ G06T 19/006 345/633 |
| 2015/0218756 | A1* | 8/2015 | Kosonen ............... D21H 11/18 162/141 |
| 2015/0296239 | A1* | 10/2015 | Burger ................. H04H 60/33 725/12 |
| 2016/0012475 | A1* | 1/2016 | Liu ....................... G06F 3/013 705/14.49 |

FOREIGN PATENT DOCUMENTS

| | | |
|---|---|---|
| CN | 2824836 Y | 10/2006 |
| CN | 101499301 A | 8/2009 |
| CN | 101924833 A | 12/2010 |
| CN | 102572524 A | 7/2012 |
| CN | 102999630 A | 3/2013 |
| CN | 103096128 A | 5/2013 |
| CN | 103763586 A | 4/2014 |
| CN | 104352228 A | 2/2015 |
| CN | 104602131 A | 5/2015 |
| CN | 104994409 A | 10/2015 |
| JP | 2002506328 A | 2/2002 |
| JP | 2008146315 A | 6/2008 |
| JP | 2010520552 A | 6/2010 |
| JP | 2013183373 A | 9/2013 |
| JP | 2014045383 A | 3/2014 |
| KR | 20140101428 A | 8/2014 |

OTHER PUBLICATIONS

English Translation of the Written Opinion of the International Search Authority in international application No. PCT/CN2016/097847, dated Nov. 30, 2016.

* cited by examiner

METHOD AND DEVICE FOR TRIGGERING INTERACTIVE APPLICATION

CROSS-REFERENCE TO RELATED APPLICATIONS

The present application claims priority to Chinese Patent Application No. 201510728014.X, filed on Oct. 30, 2015, the contents of which are hereby incorporated by reference in its entirety.

TECHNICAL FIELD

The disclosure relates to a video interaction technology in the field of communications, and particularly to a method and device for triggering an interactive application.

BACKGROUND

In a related technology, video interaction is a value-added service of a smart television and a smart set-top box. Interactive information during video interaction may be: clothes of an actor in a video, and/or a color ring back tone of a song and the like. Interactive information is usually overlaid on a video page in form of an icon or a text to prompt a user that there currently is an operable inactive content associated with a video content. However, an interactive prompt or text overlaid and frequently appearing on a video may influence an experience of a user in video watching. In addition, under the condition that multiple users watch the same video, since each user is interested in different interactive contents, for example: the user A is interested in a certain interactive content the user B is not interested in, at this moment, if the user A performs an interactive operation, watching experiences of the other users may be influenced.

SUMMARY

In order to solve the technical problem existing in the related technology, embodiments of the disclosure provide a method and device for triggering an interactive application.

The embodiments of the disclosure provide a method for triggering an interactive application, which may be applied to a wearable device, that the method including:

interactive information of each of interactive applications corresponding to a multimedia video is acquired, the interactive applications corresponding to different playing moments of the multimedia video respectively;

a user state parameter is monitored, the user state parameter being arranged to represent a degree of interest of a user in the multimedia video played at a current moment;

whether to trigger the interactive application corresponding to the current playing moment is judged on the basis of the user state parameter and a received preset condition; and if it is determined that a judgment result is YES, first prompting information arranged to prompt the user to execute the corresponding interactive application is generated on the basis of the interactive information of the interactive application corresponding to the current playing moment.

The embodiments of the disclosure further provide a method for triggering an interactive application, which may be applied to a multimedia video playing device, the method including:

interactive information of each of interactive applications corresponding to a multimedia video is sent, the interactive applications corresponding to different playing moments of the multimedia video respectively;

a preset condition corresponding to a user state parameter is sent, wherein the preset condition may be arranged for a wearable device to judge whether to trigger the interactive application corresponding to a current playing moment in combination with the user state parameter monitored by itself, and the user state parameter may be arranged to represent a degree of interest of a user in the multimedia video played at the current moment;

a logo of the interactive application corresponding to the current playing moment is received; and second prompting information arranged to prompt the user to execute the corresponding interactive application is generated on the basis of the interactive information of the interactive application corresponding to the logo, the logo being sent out when the wearable device determines to trigger the interactive application.

The embodiments of the disclosure further provide a wearable device, which may include:

an acquisition module arranged to acquire interactive information of each of interactive applications corresponding to a multimedia video, the interactive applications corresponding to different playing moments of the multimedia video respectively;

a monitoring module arranged to monitor a user state parameter, the user state parameter being arranged to represent a degree of interest of a user in the multimedia video played at a current moment;

a judgment module arranged to judge whether to trigger the interactive application corresponding to the current playing moment on the basis of the user state parameter and a received preset condition; and a first prompting module arranged to, if it is determined that a judgment result is YES, generate first prompting information on the basis of the interactive information of the interactive application corresponding to the current playing moment, the first prompting information being arranged to prompt the user to perform the corresponding interactive application.

The embodiments of the disclosure further provide a multimedia video playing device, which may include:

a sending module arranged to send interactive information of each of interactive applications corresponding to a multimedia video, the interactive applications corresponding to different playing moments of the multimedia video respectively, and send a preset condition corresponding to a user state parameter, wherein the preset condition may be arranged for a wearable device to judge whether to trigger the interactive application corresponding to a current playing moment in combination with the user state parameter monitored by itself, and the user state parameter may be arranged to represent a degree of interest of a user in the multimedia video played at the current moment;

a receiving module arranged to receive a logo of the interactive application corresponding to the current playing moment; and a second prompting module arranged to generate second prompting information on the basis of the interactive information of the interactive application corresponding to the logo, the second prompting information being arranged to prompt the user to perform the corresponding interactive application, the logo being sent out when the wearable device determines to trigger the interactive application.

According to the method and device provided by the embodiments of the disclosure for triggering the interactive application, the wearable device acquires the interactive information of each interactive application corresponding to the multimedia video, the interactive applications corresponding to different playing moments of the multimedia video respectively; the user state parameter is monitored, the user state parameter being arranged to represent the degree of interest of the user in the multimedia video played at the current moment; whether to trigger the interactive application corresponding to the current playing moment is judged on the basis of the user state parameter and the received preset condition; and if the judgment result is YES, the prompting information arranged to prompt the user to execute the corresponding interactive application is generated on the basis of the interactive information of the interactive application corresponding to the current playing moment. According to the embodiments of the disclosure, the user state parameter when the user watches the multimedia video is monitored through the wearable device, and when it is determined that the user state parameter meets the preset condition, the interactive application corresponding to the multimedia video is prompted for the user, so that interference brought to a video watching process of the user by frequent popping-up of an interactive prompt or text is further avoided, and of course, interference to another user uninterested in an interactive content is also reduced to a certain extent.

In addition, the wearable device of the embodiments of the disclosure is not required to frequently communicate with a network-side platform or the multimedia video playing device to transmit the user state parameter, and the wearable device determines whether to trigger the interactive application, so that power of the wearable device may be saved.

BRIEF DESCRIPTION OF DRAWINGS

In order to describe the technical solutions of the embodiments of the application more clearly, the drawings required to be used for descriptions about the embodiments will be simply introduced. Obviously, the drawings described below are only some embodiments recorded in the application. Those skilled in the art may further obtain other drawings according to these drawings without creative work. The following drawings are not equally scaled intentionally according to actual sizes, and the point is to show the main purpose of the application.

DETAILED DESCRIPTION

The technical solutions in some embodiments of the disclosure will be clearly and completely described below in combination with the drawings in some embodiments of the disclosure. Obviously, the described embodiments are not all embodiments but only some embodiments of the disclosure. All other embodiments obtained by those skilled in the art on the basis of the embodiments in the disclosure without creative work shall fall within the scope of protection of the disclosure.

In the embodiments of the disclosure, a wearable device acquires interactive information of each of interactive applications corresponding to a multimedia video, the interactive applications corresponding to different playing moments of the multimedia video respectively; a user state parameter is monitored, the user state parameter being arranged to represent a degree of interest of a user in the multimedia video played at a current moment; whether to trigger the interactive application corresponding to the current playing moment is judged on the basis of the user state parameter and a received preset condition; and if a judgment result is YES, prompting information arranged to prompt the user to execute the corresponding interactive application is generated on the basis of the interactive information of the interactive application corresponding to the current playing moment.

The disclosure will further be described below in combination with the drawings and specific embodiments in detail.

Figure 1:
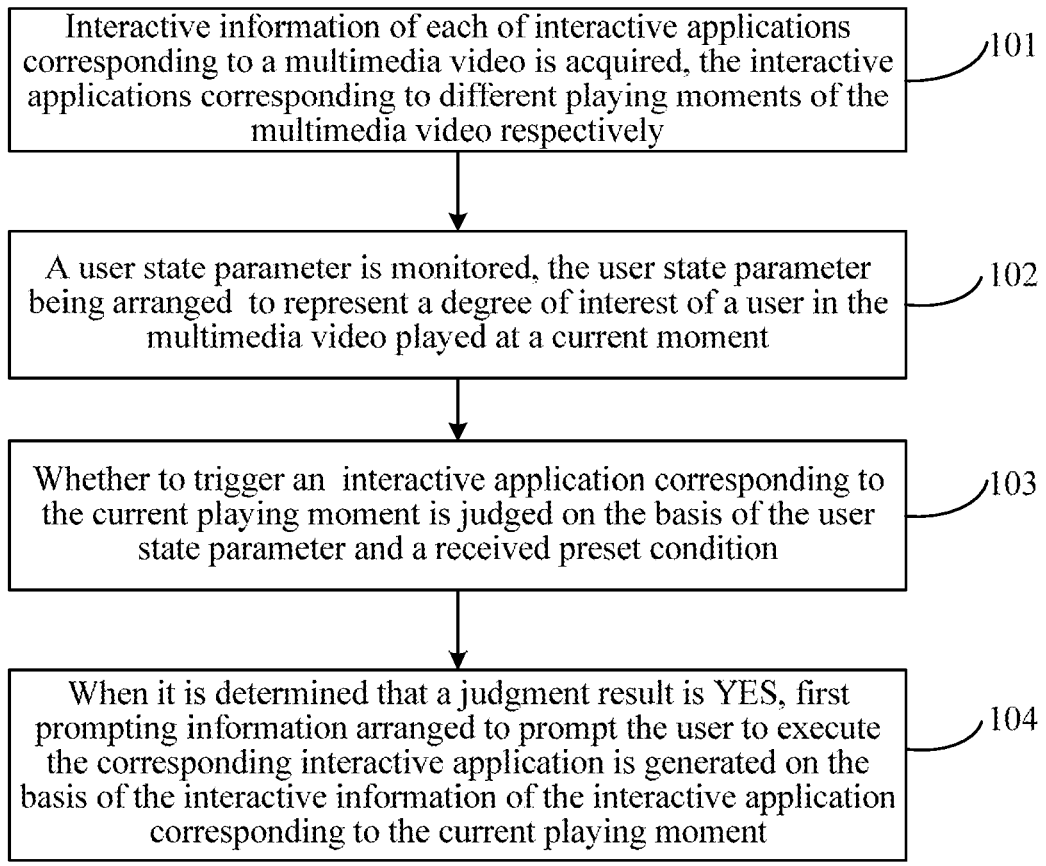
FIG. 1 is a first implementation flowchart of a method for triggering an interactive application according to an embodiment of the disclosure.

FIG. 1 is an implementation flowchart of a method for triggering an interactive application according to an embodiment of the disclosure. As shown in FIG. 1, the method is applied to a wearable device, and includes the following steps.

In Step 101, interactive information of each of interactive applications corresponding to a multimedia video is acquired, the interactive applications corresponding to different playing moments of the multimedia video respectively.

In Step 102, a user state parameter is monitored, the user state parameter being arranged to represent a degree of interest of a user in the multimedia video played at a current moment.

In Step 103, whether to trigger the interactive application corresponding to the current playing moment is judged on the basis of the user state parameter and a received preset condition.

In Step 104, if it is determined that a judgment result is YES, first prompting information arranged to prompt the user to execute the corresponding interactive application is generated on the basis of the interactive information of the interactive application corresponding to the current playing moment.

In the embodiment of the disclosure, the interactive information of each interactive application may be acquired from a multimedia video playing device, or, is actively transmitted to the wearable device by the multimedia video playing device. An approach for acquisition or transmission may be a wireless communication network, for example: Wireless Fidelity (WIFI).

Here, the interactive information may at least include: a logo (for example, an Identifier (ID)) of the interactive application and the playing moment of the interactive application, and of course, may further include data such as a related introduction about the interactive application.

As an example, the operation that the user state parameter is monitored includes that:

a first monitoring instruction is received, the first monitoring instruction being arranged to notify the wearable device to monitor the user state parameter in real time in a playing process of the multimedia video, and the user state parameter is monitored on the basis of the first monitoring instruction; or, a second monitoring instruction is received, the second monitoring instruction being arranged to notify the wearable device to monitor the user state parameter within a preset time period, and the user state parameter is monitored on the basis of the second monitoring instruction.

Here, the wearable device may start a user state parameter monitoring mode when the multimedia video is started to be played until the multimedia video is stopped being played. For example, when starting playing the multimedia video, the multimedia video playing device notifies the wearable device to start monitoring until playing is stopped; or, for further saving power of the wearable device, the multimedia video playing device may notify the wearable device to perform monitoring within a preset time period, wherein the preset time period may be a moment adjacent to the playing moment of each interactive application, for example: monitoring is started 20 minutes earlier than the playing moment corresponding to the interactive application until the playing moment is ended.

In the embodiment, the operation that whether to trigger the interactive application corresponding to the current playing moment is judged on the basis of the user state parameter and the received preset condition includes that:

the monitored user state parameter is analyzed on the basis of the preset condition;

when it is determined that the degree of interest, represented by the user state parameter, of the user in the multimedia video is higher than or equal to a preset value, the interactive application corresponding to the current playing moment is triggered; and when it is determined that the degree of interest, represented by the user state parameter, of the user in the multimedia video is lower than the preset value, the user state parameter is continued to be monitored until the multimedia video is stopped being played.

In the embodiment of the disclosure, the user state parameter may include: one or more parameters of a heart rate, blood pressure and the like.

Exemplarily, the user state parameter is the heart rate, and the preset condition may be that: the heart rate exceeds an average rate of previous 5 adjacent minutes by 15%, then it is necessary to extract a heart rate of each time point of the previous 5 minutes and calculate an average of these values, the user state parameter of the current moment is compared with the average, if it is determined that the average is exceeded by 15% (it is determined that the degree of interest of the user in the multimedia video is higher than the preset value), the interactive application corresponding to the current playing moment is triggered, otherwise the user state parameter is continued to be monitored until the multimedia video is stopped being played.

In the embodiment of the disclosure, the operation that the first prompting information is generated on the basis of the interactive information of the interactive application corresponding to the current playing moment includes that:

the current playing moment is determined;

the interactive information of the interactive application corresponding to the playing moment is determined from among the acquired interactive information of each interactive application; and the first prompting information is generated on the basis of the interactive information, the first prompting information being presented on a display interface of the wearable device.

Exemplarily, the wearable device may generate the first prompting information presented through an interactive prompt or text on the basis of the interactive information and display it on the wearable device, for example, an interface of a smart watch.

Figure 2:
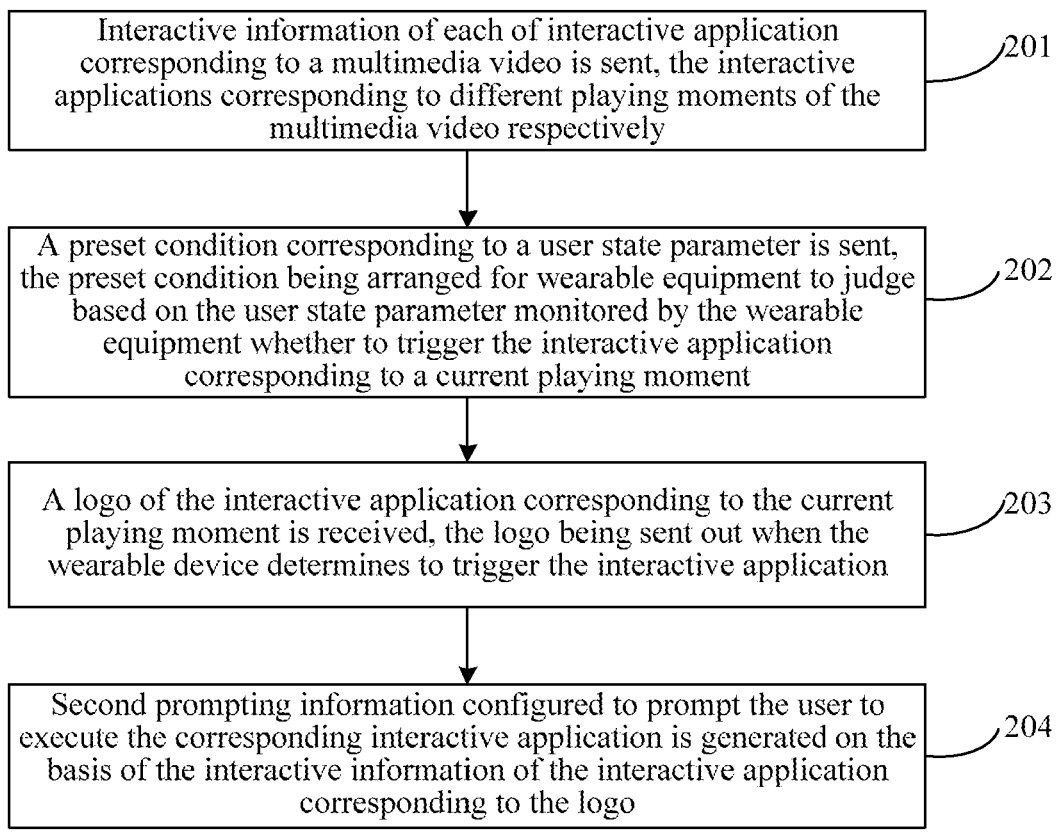
FIG. 2 is a second implementation flowchart of a method for triggering an interactive application according to an embodiment of the disclosure.

An embodiment of the disclosure further provides a method for triggering an interactive application, which is applied to a multimedia video playing device. As shown in FIG. 2, the method includes the following steps.

In Step 201, interactive information of each of interactive applications corresponding to a multimedia video is sent, the interactive applications corresponding to different playing moments of the multimedia video respectively.

In Step 202, a preset condition corresponding to a user state parameter is sent.

Wherein, the preset condition is arranged for a wearable device to judge whether to trigger the interactive application corresponding to a current playing moment in combination with the user state parameter monitored by itself, and the user state parameter is arranged to represent a degree of interest of a user in the multimedia video played at the current moment.

In Step 203, a logo of the interactive application corresponding to the current playing moment is received, the logo being sent out when the wearable device determines to trigger the interactive application.

In Step 204, second prompting information arranged to prompt the user to execute the corresponding interactive application is generated on the basis of the interactive information of the interactive application corresponding to the logo.

Wherein, there is no sequence between 201 and Step 202, or the two steps may be executed at the same time, that is, the interactive information and the preset condition are sent out at the same time.

Here, the multimedia video playing device may request an interactive application platform for the interactive information of each interactive application corresponding to the multimedia video in advance and then send it, for example, sending it to the wearable device. The preset condition may also be preset by the interactive application platform and transmitted to the multimedia video playing device together with the interactive information for the multimedia video playing device to send to the wearable device.

Exemplarily, the wearable device may send the logo of the interactive application, for example, an ID of the interactive application, corresponding to the current playing moment to the multimedia video playing device when determining to trigger the interactive application; and the multimedia video playing device searches the interactive information, transmitted by the interactive application platform, of each interactive application for the interactive information of the interactive application corresponding to the logo on the basis of the logo.

In the embodiment of the disclosure, the operation that the second prompting information is generated on the basis of the interactive information of the interactive application corresponding to the logo includes that:

the interactive information of the interactive application corresponding to the logo is determined; and the second prompting information is generated on the basis of the interactive information, the second prompting information being presented on a display interface of the multimedia video playing device.

Exemplarily, the multimedia video playing device may generate the second prompting information presented through an interactive prompt or text on the basis of the interactive information and display it on the multimedia video playing device, for example, an interface of a television or a smart set-top box.

Obviously, according to the embodiments of the disclosure, the user state parameter when the user watches the multimedia video is monitored through the wearable device, and when it is determined that the user state parameter meets the preset condition, the interactive application corresponding to the multimedia video is prompted for the user, so that interference brought to a video watching process of the user by frequent popping-up of the interactive prompt or text is further avoided, and of course, interference to another user uninterested in an interactive content is also reduced to a certain extent.

In addition, the wearable device of the embodiments of the disclosure is not required to frequently communicate with a network-side platform or the multimedia video playing device to transmit the user state parameter, and the wearable device determines whether to trigger the interactive application, so that power of the wearable device may be saved.

Figure 3:
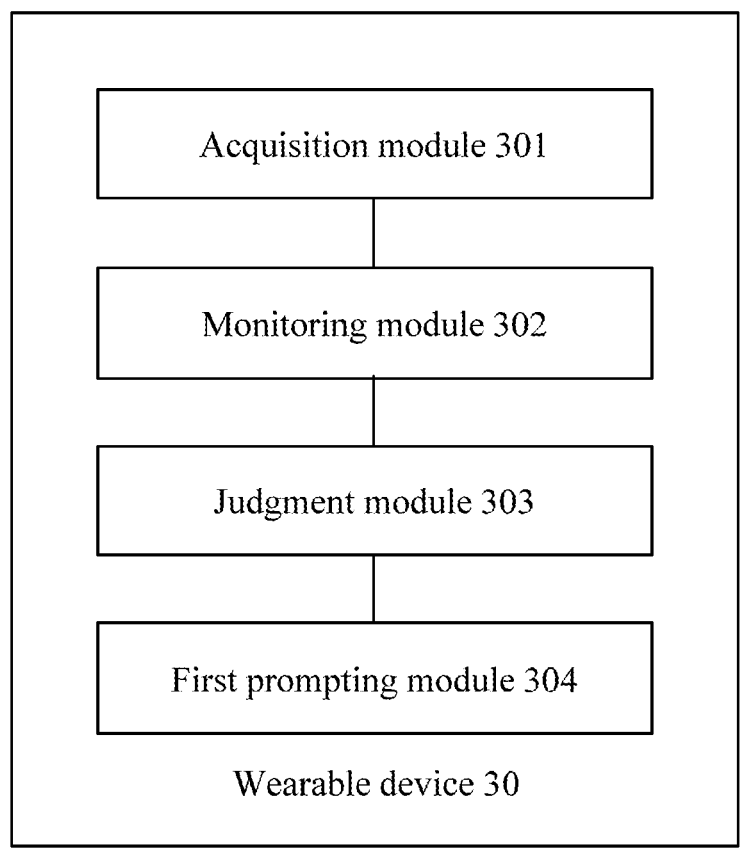
FIG. 3 is a structure diagram of a wearable device according to an embodiment of the disclosure.

An embodiment of the disclosure further provides a wearable device. As shown in FIG. 3, the device 30 includes:

an acquisition module 301 arranged to acquire interactive information of each of interactive applications corresponding to a multimedia video, the interactive applications corresponding to different playing moments of the multimedia video respectively;

a monitoring module 302 arranged to monitor a user state parameter, the user state parameter being arranged to represent a degree of interest of a user in the multimedia video played at a current moment;

a judgment module 303 arranged to judge whether to trigger the interactive application corresponding to the current playing moment on the basis of the user state parameter and a received preset condition; and a first prompting module 304 arranged to, if it is determined that a judgment result is YES, generate first prompting information on the basis of the interactive information of the interactive application corresponding to the current playing moment, the first prompting information being arranged to prompt the user to perform the corresponding interactive application.

In the embodiment of the disclosure, the interactive information of each interactive application may be acquired from a multimedia video playing device, or, is actively transmitted to the wearable device by the multimedia video playing device. An approach for acquisition or transmission may be a wireless communication network, for example: WIFI.

Here, the interactive information may at least include: a logo (for example, an ID) of the interactive application and the playing moment of the interactive application, and of course, may further include data such as a related introduction about the interactive application.

Figure 4:
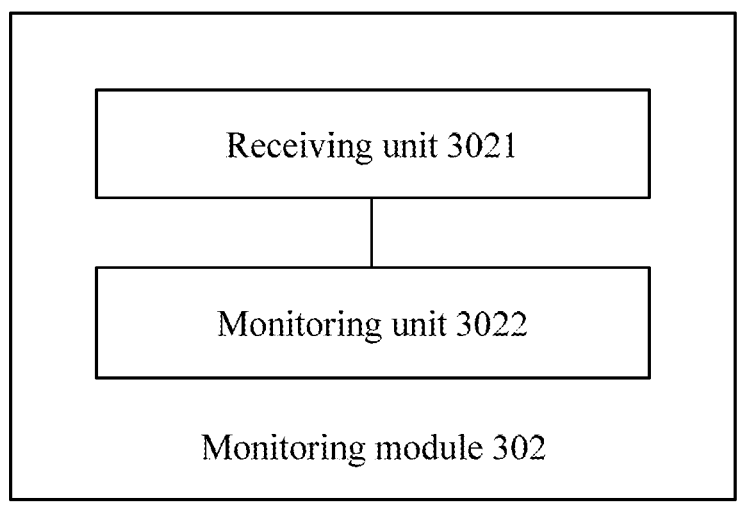
FIG. 4 is a structure diagram of a monitoring module in a wearable device according to an embodiment of the disclosure.

As an example, as shown in FIG. 4, the monitoring module 302 includes:

a receiving unit 3021 arranged to receive a first monitoring instruction, the first monitoring instruction being arranged to notify the wearable device to monitor the user state parameter in real time in a playing process of the multimedia video, or, receive a second monitoring instruction, the second monitoring instruction being arranged to notify the wearable device to monitor the user state parameter within a preset time period; and a monitoring unit 3022 arranged to monitor the user state parameter on the basis of the first monitoring instruction, or, monitor the user state parameter on the basis of the second monitoring instruction.

Here, the wearable device may start a user state parameter monitoring mode when the multimedia video is started to be played until the multimedia video is stopped being played. For example, when starting playing the multimedia video, the multimedia video playing device notifies the wearable device to start monitoring until playing is stopped; or, for further saving power of the wearable device, the multimedia video playing device may notify the wearable device to perform monitoring within a preset time period, wherein the preset time period may be a moment adjacent to the playing moment of each interactive application, for example: monitoring is started 20 minutes earlier than the playing moment corresponding to the interactive application until the playing moment is ended.

Figure 5:
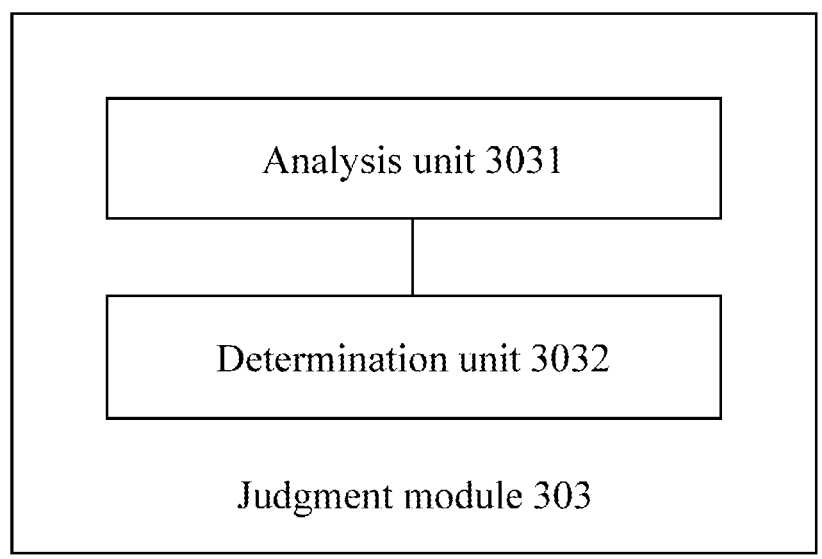
FIG. 5 is a structure diagram of a judgment module in a wearable device according to an embodiment of the disclosure.

In the embodiment, as shown in FIG. 5, the judgment module 303 includes:

an analysis unit 3031 arranged to analyze the monitored user state parameter on the basis of the preset condition; and a judgment unit 3032 arranged to, when it is determined that the degree of interest, represented by the user state parameter, of the user in the multimedia video is higher than or equal to a preset value, trigger the interactive application corresponding to the current playing moment, and when it is determined that the degree of interest, represented by the user state parameter, of the user in the multimedia video is lower than the preset value, continue monitoring the user state parameter until the multimedia video is stopped being played.

In the embodiment of the disclosure, the user state parameter may include: one or more parameters of a heart rate, blood pressure and the like.

Exemplarily, the user state parameter is the heart rate, and the preset condition may be that: the heart rate exceeds an average rate of previous 5 adjacent minutes by 15%, then it is necessary to extract a heart rate of each time point of the previous 5 minutes and calculate an average of these values, the user state parameter of the current moment is compared with the average, if it is determined that the average is exceeded by 15% (it is determined that the degree of interest of the user in the multimedia video is higher than the preset value), the interactive application corresponding to the current playing moment is triggered, otherwise the user state parameter is continued to be monitored until the multimedia video is stopped being played.

Figure 6:
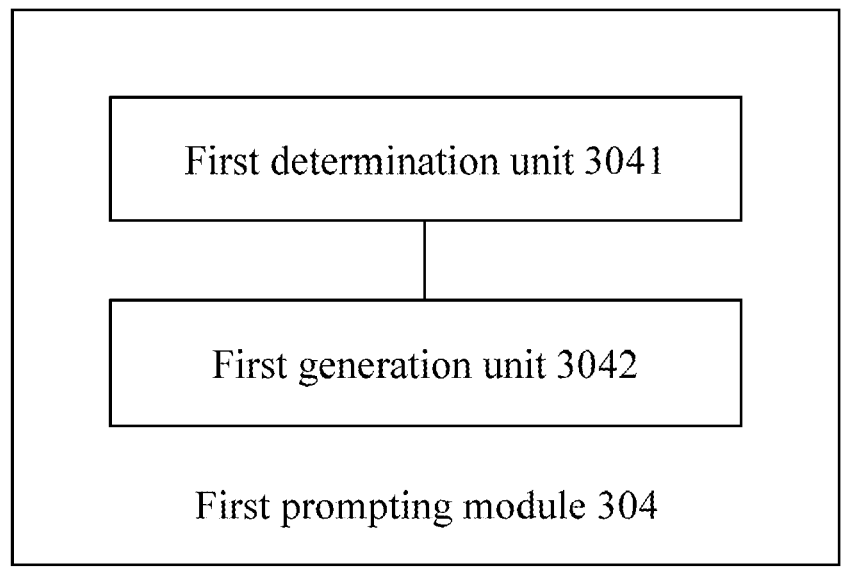
FIG. 6 is a structure diagram of a first prompting module in a wearable device according to an embodiment of the disclosure.

In the embodiment of the disclosure, as shown in FIG. 6, the first prompting module 304 includes:

a first determination unit 3041 arranged to determine the current playing moment, and determine the interactive information of the interactive application corresponding to the playing moment from among the acquired interactive information of each interactive application; and a first generation unit 3042 arranged to generate the first prompting information on the basis of the interactive information, the first prompting information being presented on a display interface of the wearable device.

Exemplarily, the wearable device may generate the first prompting information presented through an interactive prompt or text on the basis of the interactive information and display it on the wearable device, for example, an interface of a smart watch.

Figure 7:
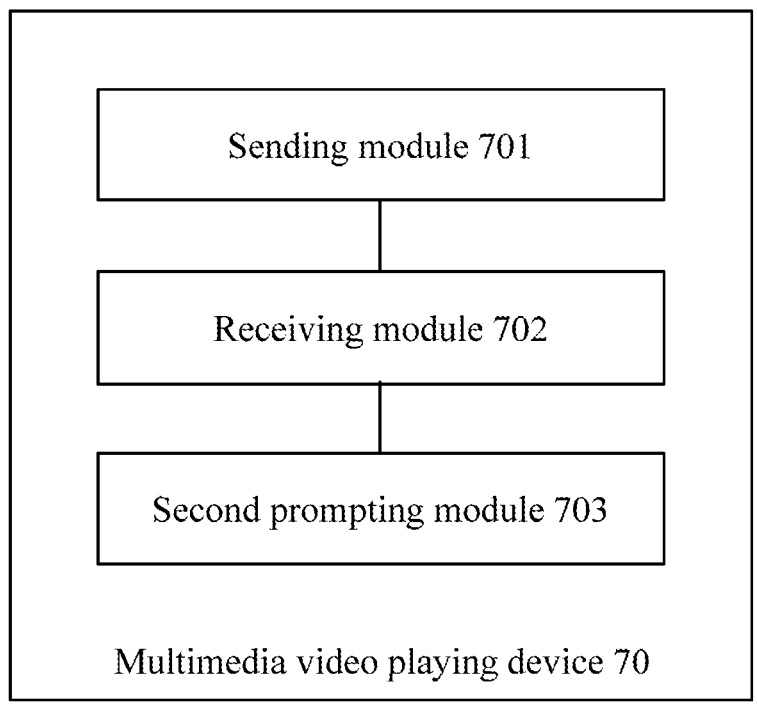
FIG. 7 is a structure diagram of multimedia video playing device according to an embodiment of the disclosure.

An embodiment of the disclosure further provides a multimedia video playing device. As shown in FIG. 7, the device 70 includes:

a sending module 701 arranged to send interactive information of each of interactive applications corresponding to a multimedia video, the interactive applications corresponding to different playing moments of the multimedia video respectively, and send a preset condition corresponding to a user state parameter, wherein the preset condition is arranged for a wearable device to judge whether to trigger the interactive application corresponding to a current playing moment in combination with the user state parameter monitored by itself, and the user state parameter is arranged to represent a degree of interest of a user in the multimedia video played at the current moment;

a receiving module 702 arranged to receive a logo of the interactive application corresponding to the current playing moment; and a second prompting module 703 arranged to generate second prompting information on the basis of the interactive information of the interactive application corresponding to the logo, the second prompting information being arranged to prompt the user to perform the corresponding interactive application, the logo being sent out when the wearable device determines to trigger the interactive application.

In the embodiment of the disclosure, there is no sequence between sending of the interactive information and the preset condition, and they may also be sent out at the same time.

Here, the multimedia video playing device may request an interactive application platform for the interactive information of each interactive application corresponding to the multimedia video in advance and then send it, for example, sending it to the wearable device. The preset condition may also be preset by the interactive application platform and transmitted to the multimedia video playing device together with the interactive information for the multimedia video playing device to send to the wearable device.

Exemplarily, the wearable device may send the logo of the interactive application, for example, an ID of the interactive application, corresponding to the current playing moment to the multimedia video playing device when determining to trigger the interactive application; and the multimedia video playing device searches the interactive information, transmitted by the interactive application platform, of each interactive application for the interactive information of the interactive application corresponding to the logo on the basis of the logo.

Figure 8:
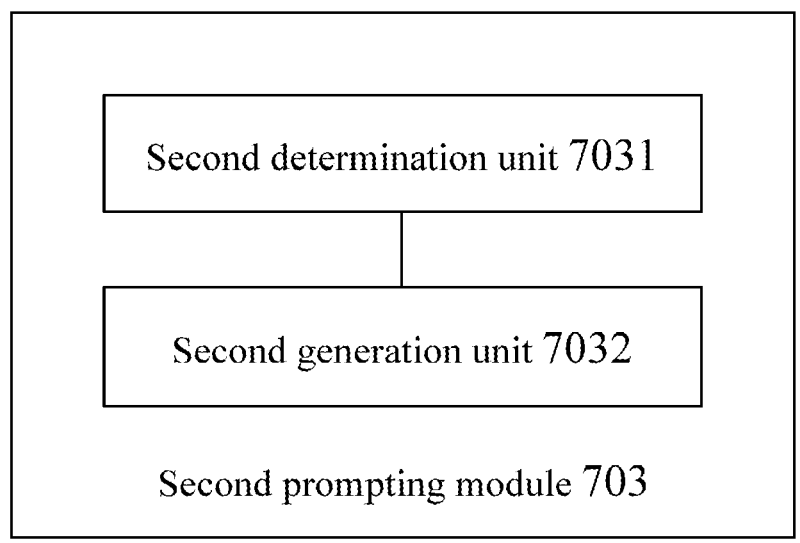
FIG. 8 is a structure diagram of a second prompting module in a multimedia video playing device according to an embodiment of the disclosure.

In the embodiment of the disclosure, as shown in FIG. 8, the second prompting module 703 includes:

a second determination unit 7031 arranged to determine the interactive information of the interactive application corresponding to the logo; and a second generation unit 7032 arranged to generate the second prompting information on the basis of the interactive information, the second prompting information being presented on a display interface of the multimedia video playing device.

Exemplarily, the multimedia video playing device may generate the second prompting information presented through an interactive prompt or text on the basis of the interactive information and display it on the multimedia video playing device, for example, an interface of a television or a smart set-top box.

The disclosure will be described below in combination with a specific application scenario.

Figure 9:
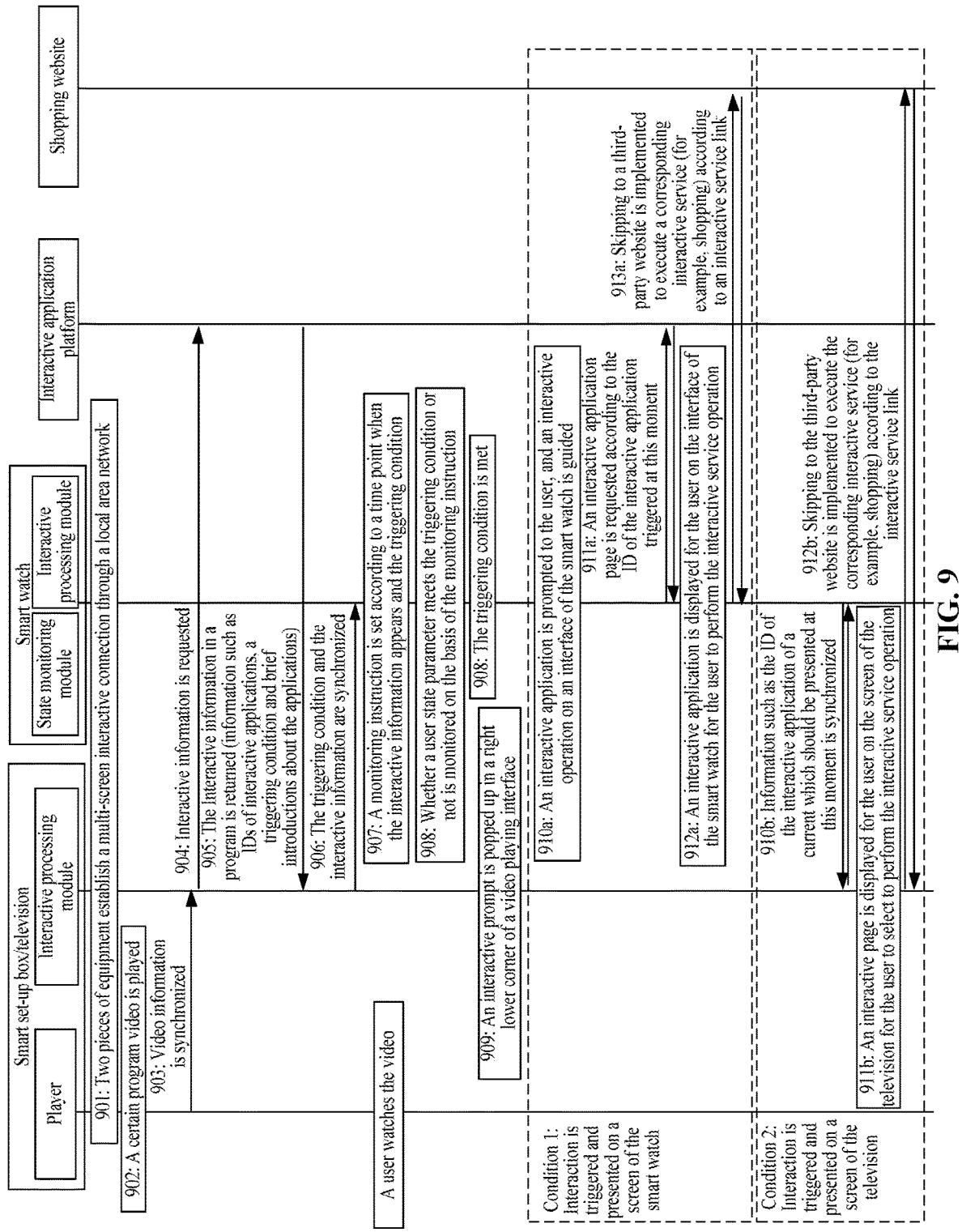
FIG. 9 is a flowchart of a method for triggering an interactive application according to an application scenario of the disclosure.

FIG. 9 is a flowchart of a method for triggering an interactive application according to the application scenario. As shown in FIG. 9, the method includes the following steps.

In Step 901, a smart set-up box/television establishes a multi-screen interactive connection with a smart watch through a local area network.

In Step 902, a player in the smart set-up box/television plays a program video.

In Step 903, the player in the smart set-up box/television synchronizes program video information into an interactive processing module.

In Step 904, the interactive processing module in the smart set-up box/television sends an interactive information request to an interactive application platform.

In Step 905, the interactive application platform returns interactive information corresponding to interactive applications in the program video, wherein the interactive information may include information such as IDs of the interactive applications, a triggering condition and brief introductions about the interactive applications.

In Step 906, the interactive processing module in the smart set-up box/television synchronizes the triggering condition and the interactive information to an interactive processing module in the smart watch.

In Step 907, the interactive processing module in the smart watch sets a monitoring instruction of a user state parameter according to a time point when the interactive information appears and the triggering condition.

In Step 908, the interactive processing module in the smart watch monitors whether the user state parameter meets the triggering condition on the basis of the monitoring instruction, and determines that the user state parameter is consistent with the triggering condition.

In Step 909, the interactive processing module in the smart set-up box/television pops up an interactive prompt in a right lower corner of a video playing interface.

Here, the interactive prompt may be in form of text or picture.

Descriptions will be made below from interaction in the smart watch and the smart set-up box/television respectively.

Interaction in the smart watch includes the following steps.

In Step 910a, the interactive processing module in the smart watch prompts an interactive application to the user, and guides the user to perform an interactive operation on an interface of the smart watch.

In Step 911a, the interactive processing module in the smart watch requests for an interactive application page according to the ID of the interactive application triggered at this moment.

In Step 912a, the interactive processing module in the smart watch displays an interactive application for the user on the interface of the smart watch for the user to perform the interactive service operation.

In Step 913a, the interactive processing module in the smart watch skips to a third-party website to execute a corresponding interactive service according to an interactive service link.

Interaction in the smart set-up box/television includes the following steps.

In Step 910b, the interactive processing module in the smart watch synchronizes the ID of the interactive application of a current playing moment into the interactive processing module in the smart set-up box/television.

Here, information such as the user state parameter may further be synchronized for display in the smart set-up box/television, so that flexibility is relatively high, and different experiences may be provided for the user.

In Step 911b, the interactive processing module in the smart set-up box/television displays an interactive page for the user on a display screen of the smart set-up box/television for the user to select to perform the interactive service operation.

In Step 912b, the interactive processing module in the smart set-up box/television skips to the third-party website to execute the corresponding interactive service according to the interactive service link.

According to the embodiments of the disclosure, the user state parameter when the user watches the multimedia video is monitored through the wearable device, and when it is determined that the user state parameter meets the preset condition, the interactive application corresponding to the multimedia video is prompted for the user, so that interference brought to a video watching process of the user by frequent popping-up of the interactive prompt or text is further avoided, and of course, interference to another user uninterested in an interactive content is also reduced to a certain extent.

In addition, the wearable device of the embodiments of the disclosure is not required to frequently communicate with a network-side platform or the multimedia video playing device to transmit the user state parameter, and the wearable device determines whether to trigger the interactive application, so that power of the wearable device may be saved.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

The above is only the preferred implementation mode of the disclosure. It is important to point out that those skilled in the art may further make a plurality of improvements and embellishments without departing from the principle of the disclosure and these improvements and embellishments shall also fall within the scope of protection of the disclosure.

The invention claimed is:

1. A method for triggering an interactive application, applied to a wearable device, the method comprising:
   acquiring, by the wearable device, interactive information of each of interactive applications corresponding to a multimedia video displayed on a multimedia video playing device, the interactive applications corresponding to different playing moments of the multimedia video respectively;
   monitoring, by the wearable device, a user state parameter, the user state parameter being arranged to represent a degree of interest of a user in the multimedia video played at a current moment;
   judging, by the wearable device, whether to trigger an interactive application corresponding to the current playing moment on the basis of the user state parameter and a received preset condition; and
   when it is determined that a judgment result is YES, generating first prompting information on the basis of the interactive information of the interactive application corresponding to the current playing moment, and displaying the first prompting information on the wearable device, the first prompting information being arranged to prompt the user to perform the corresponding interactive application,
   wherein the received preset condition is that a value of the user state parameter at the current moment exceeds an average value of the user state parameter within a preset adjacent period of time before the current moment by a predetermined percentage.

2. The method according to claim 1, wherein monitoring the user state parameter comprises:
   receiving a first monitoring instruction, the first monitoring instruction being arranged to notify the wearable device to monitor the user state parameter in real time in a playing process of the multimedia video, and monitoring the user state parameter on the basis of the first monitoring instruction; or,
   receiving a second monitoring instruction, the second monitoring instruction being arranged to notify the wearable device to monitor the user state parameter within a preset time period, and monitoring the user state parameter on the basis of the second monitoring instruction.

3. The method according to claim 1, wherein judging whether to trigger the interactive application corresponding to the current playing moment on the basis of the user state parameter and the received preset condition comprises:

analyzing the monitored user state parameter on the basis of the preset condition;

when it is determined that the degree of interest, represented by the user state parameter, of the user in the multimedia video is higher than or equal to a preset value, triggering the interactive application corresponding to the current playing moment; and when it is determined that the degree of interest, represented by the user state parameter, of the user in the multimedia video is lower than the preset value, continuing monitoring the user state parameter until the multimedia video is stopped being played.

4. The method according to claim 1, wherein generating the first prompting information on the basis of the interactive information of the interactive application corresponding to the current playing moment comprises:

determining the current playing moment;

determining the interactive information of the interactive application corresponding to the playing moment from among the acquired interactive information of each interactive application; and generating the first prompting information on the basis of the interactive information, the first prompting information being presented on a display interface of the wearable device.

5. A method for triggering an interactive application, applied to a multimedia video playing device, the method comprising:

sending, by the multimedia video playing device, interactive information of each of interactive applications corresponding to a multimedia video played on the multimedia video playing device, the interactive applications corresponding to different playing moments of the multimedia video respectively;

sending, by the multimedia video playing device, a preset condition corresponding to a user state parameter, wherein the preset condition is arranged for a wearable device to judge whether to trigger the interactive application corresponding to a current playing moment in combination with the user state parameter monitored by itself, and the user state parameter is arranged to represent a degree of interest of a user in the multimedia video played at the current moment;

receiving, by the multimedia video playing device, a logo of the interactive application corresponding to the current playing moment; and generating, by the multimedia video playing device, second prompting information on the basis of the interactive information of the interactive application corresponding to the logo, the second prompting information being arranged to prompt the user to perform the corresponding interactive application, the logo being sent out when the wearable device determines to trigger the interactive application, wherein the preset condition is that a value of the user state parameter at the current moment exceeds an average value of the user state parameter within a preset adjacent period of time before the current moment by a predetermined percentage.

6. The method according to claim 5, wherein generating the second prompting information on the basis of the interactive information of the interactive application corresponding to the logo comprises:

determining the interactive information of the interactive application corresponding to the logo; and generating the second prompting information on the basis of the interactive information, the second prompting information being presented on a display interface of the multimedia video playing device.

7. A wearable device, comprising:

a processor; and a memory for storing instructions executable by the processor, wherein the processor is arranged to:

acquire interactive information of each of interactive applications corresponding to a multimedia video displayed on a multimedia video playing device, the interactive applications corresponding to different playing moments of the multimedia video respectively;

monitor a user state parameter, the user state parameter being arranged to represent a degree of interest of a user in the multimedia video played at a current moment;

judge whether to trigger the interactive application corresponding to the current playing moment on the basis of the user state parameter and a received preset condition; and when it is determined that a judgment result is YES, generate first prompting information on the basis of the interactive information of the interactive application corresponding to the current playing moment, and display the first prompting information on the wearable device, the first prompting information being arranged to prompt the user to perform the corresponding interactive application, wherein the received preset condition is that a value of the user state parameter at the current moment exceeds an average value of the user state parameter within a preset adjacent period of time before the current moment by a predetermined percentage.

8. The device according to claim 7, wherein monitoring the user state parameter comprises:

receiving a first monitoring instruction, the first monitoring instruction being arranged to notify the wearable device to monitor the user state parameter in real time in a playing process of the multimedia video, and monitoring the user state parameter on the basis of the first monitoring instruction; or, receiving a second monitoring instruction, the second monitoring instruction being arranged to notify the wearable device to monitor the user state parameter within a preset time period, and monitoring the user state parameter on the basis of the second monitoring instruction.

9. The device according to claim 7, wherein judging whether to trigger the interactive application corresponding to the current playing moment on the basis of the user state parameter and the received preset condition comprises:

analyzing the monitored user state parameter on the basis of the preset condition; and when it is determined that the degree of interest, represented by the user state parameter, of the user in the multimedia video is higher than or equal to a preset value, triggering the interactive application corresponding to the current playing moment, and when it is determined that the degree of interest, represented by the user state parameter, of the user in the multimedia video is lower than the preset value, continuing monitoring the user state parameter until the multimedia video is stopped being played.

10. The device according to claim 7, wherein generating the first prompting information on the basis of the interactive information of the interactive application corresponding to the current playing moment comprises:
- determining the current playing moment, and determining the interactive information of the interactive application corresponding to the playing moment from among the acquired interactive information of each interactive application; and
- generating the first prompting information on the basis of the interactive information, the first prompting information being presented on a display interface of the wearable device.

11. A multimedia video playing device, comprising:
a processor; and
a memory for storing instructions executable by the processor,
wherein the processor is arranged to:
- send interactive information of each of interactive applications corresponding to a multimedia video played on the multimedia video playing device, the interactive applications corresponding to different playing moments of the multimedia video respectively;
- send a preset condition corresponding to a user state parameter,
wherein the preset condition is arranged for wearable device to judge whether to trigger the interactive application corresponding to a current playing moment in combination with the user state parameter monitored by itself, and the user state parameter is arranged to represent a degree of interest of a user in the multimedia video played at the current moment;
- receive a logo of the interactive application corresponding to the current playing moment; and
- generate second prompting information on the basis of the interactive information of the interactive application corresponding to the logo, the second prompting information being arranged to prompt the user to perform the corresponding interactive application, the logo being sent out when the wearable device determines to trigger the interactive application,
wherein the preset condition is that a value of the user state parameter at the current moment exceeds an average value of the user state parameter within a preset adjacent period of time before the current moment by a predetermined percentage.

12. The device according to claim 11, wherein generating the second prompting information on the basis of the interactive information of the interactive application corresponding to the logo comprises:
- determining the interactive information of the interactive application corresponding to the logo; and
- generating the second prompting information on the basis of the interactive information, the second prompting information being presented on a display interface of the multimedia video playing device.

13. The method according to claim 1, wherein the user state parameter comprises at least one of heart rate or blood pressure.

14. The method according to claim 5, wherein the user state parameter comprises at least one of heart rate or blood pressure.

15. The device according to claim 7, wherein the user state parameter comprises at least one of heart rate or blood pressure.

16. The device according to claim 11, wherein the user state parameter comprises at least one of heart rate or blood pressure.

* * * * *